(12) United States Patent
Sumner (10) Patent No.: US 7,443,825 B2
(45) Date of Patent: Oct. 28, 2008

(54) METHOD AND APPARATUS FOR PROVIDING A STAND-ALONE WIRELESS WEB SERVICE

(76) Inventor: Terence Edward Sumner, 5201 Panama Dr., Rowlett, TX (US) 75088

( * ) Notice: Subject to any disclaimer, the term of this patent is extended or adjusted under 35 U.S.C. 154(b) by 0 days.

(21) Appl. No.: 11/075,077

(22) Filed: Mar. 8, 2005

(65) Prior Publication Data
US 2006/0218296 A1    Sep. 28, 2006

(51) Int. Cl.
*H04Q 7/24* (2006.01)
(52) U.S. Cl. .................. 370/338; 455/552.1; 455/556.1
(58) Field of Classification Search .................. 370/338, 370/395.52; 455/556.1, 557; 709/223
See application file for complete search history.

(56) References Cited
U.S. PATENT DOCUMENTS
6,629,137 B1 * 9/2003 Wynn .......................... 709/223

7,043,633 B1 * 5/2006 Fink et al. .................... 713/162

* cited by examiner

*Primary Examiner*—Temica M Beamer (57) ABSTRACT

A wireless client in accordance with the invention in range of a suitable wireless access point requests content from a host. The wireless access point routes the initial name resolution request to a local name server that resolves certain host names, actually elsewhere, falsely as addresses on a local network, preferably a private network. The name-server response is sent back to the wireless client, which in turn then sends the request for content to the local address. A router coupled to the wireless access point acts normally to forward the request to a local content server. A local server responds with a copy of content initially synchronized with content available elsewhere. Not all content may be duplicated and some may be unavailable locally. Content may be other than HTML and accessed by various protocols, e.g. FTP, SMTP, Telnet, etc. that utilize hostname resolution services. Wired clients work similarly.

18 Claims, 4 Drawing Sheets

METHOD AND APPARATUS FOR PROVIDING A STAND-ALONE WIRELESS WEB SERVICE

FIELD OF THE INVENTION

This invention relates in general to wireless systems, and more specifically to a method and apparatus for providing a local wireless web service that is not interconnected to the World-Wide Web.

BACKGROUND OF THE INVENTION

The Internet, commonly referred to as the World-Wide Web (WWW), has exploded in growth since the advent of hypertext a decade ago. Incorporation of WWW technology has recently expanded to include wireless methodologies, in particular the Institute of Electrical and Electronic Engineers (IEEE) standard 802.11. Devices with 802.11 technologies have been alternately denoted as WiFi™ and offer connection into local network systems via a wireless Access Point (AP). Such APs communicate over the air using IEEE 802.11 protocols to bear Internet Engineering Task Force (IETF) standard communication protocols. The underlying 802.11 bearer is not significant, except that it has recently grown in popularity after resolution of serious security concerns in earlier protocol methods. Application programs depend on the Internet Protocol (IP) and Transmission Control Protocol (TCP) or User Datagram Protocol (UDP) higher layers of the IETF stack to achieve internetworking capabilities.

Applications, such as electronic mail delivery using Simple Mail Transfer Protocol (SMTP) and access to web pages of hypertext using hypertext transfer protocol (HTTP) and secure HTTP (HTTPS), depend upon the TCP/IP stack for actual delivery of content. Some applications depend upon UDP/IP at least in part for proper functioning. Web page delivery and e-mail delivery depend upon finding the correct IP address for connecting communicating internetworked hosts. Hosts can be clients or servers or stand alone. Applications use the IP addresses instead of the human-readable host names for communicating between hosts. Hosts maintain a cached translation table for converting host names into IP addresses.

Finding IP addresses was greatly improved some years using ago by introduction of the Domain Name Service (DNS). DNS resolves computer host names, which are simpler for humans to understand, into IP addresses, usually in real time. DNS depends upon internetworked name servers, at least one at the edge of each domain to resolve addresses of hosts within that domain. DNS servers are arranged in a hierarchy from segments of a sub-domain to sub-domain to domain to zones to top-level domains. Queries to resolve host names are remitted in turn to each level of the hierarchy until an authoritative answer is received. This answer is normally provided by the DNS server attached at the edge of the domain for the host being sought.

The answer provided by DNS is used to update the cached translation table or populate it with new host names. In turn the resulting IP address for the target host is used by the application to indicate to the communication protocol stack where to send the application message (request or response). Normally, software applications that are tied into the communications protocol stack automatically integrate the DNS query-response into HTTP and HTTPS 'post's and 'get's. Switches and routers direct the application messages according to routing tables toward the target until it reaches the destination indicated by DNS.

Wireless APs allow association with the network that they are part of by first assigning an IP address to the supplicant wireless device usually using Dynamic Host Configuration Protocol (DHCP), that address being part of the network address space and not necessarily one that could be accessed from outside the network. For example, DHCP may assign the supplicant wireless device an address from the 192.168.0.0-192.168.255.255 range of IP addresses. Then, using network address translation (NAT), the router at the edge of the network keeps track of which 192.168.0.0 series or other private address made a request that traverses the NAT router and routes responses coming into the true Internet address and port to the corresponding private address. Some business owners, notably Starbucks, have installed WiFi™ APs for their customers to use while present. The customers are not provisioned to pass their web requests through to the Internet until they have been identified and authorized. Web-page requests always return a web page used to identify and authorize the customer until the customer is authorized. In effect, no DNS resolution occurs for unauthorized users, instead a fixed web page or set of web pages is retrieved regardless of request. Once authorized, DNS is used properly and the web page requested is retrieved from the WWW.

Handheld devices, commonly called a personal digital assistant (PDA), typically can be outfitted with wireless technology to provide WWW access to the Internet, especially through 802.11 APs. These PDAs rely on having wireless APs to provide web pages and other Internet services from WWW.

A limitation of prior art access points is that Internet connections are not available everywhere. It made little sense to install a wireless AP where no path to the WWW exists. The need for displaying web pages written in hypertext is not, however, limited to those geographic areas served by wireless APs that are connected to the Internet A user of a PDA having wireless capability who enters a retail store, for example, may wish to display hypertext documents compatible with the WWW on his PDA, such as sales advertisements of items offered at special terms, or to download and display an internal floor-plan of the store showing where particular goods are. The user may wish to "chat" (immediate messaging) in real time to store personnel. The store may not have or may not wish to offer interconnection to the Internet to such visitors. Furthermore, a user needs to be within range of a wireless access point. Another limitation is that for APs without an Internet connection those web pages that are retrieved will have legitimate host addresses and document paths on the network of the AP, even if the document is a synchronized copy of one on the WWW. Saving the uniform resource locators and indicators (URLs, URIs) for a web-page from a stand-alone network, commonly known as bookmarks, will not later work unless the host and path names agree.

Thus, what is needed is a method and apparatus for providing a stand-alone wireless web service, not connected to the Internet Preferably, the method and apparatus will remain fully compatible with WWW methods, even when not connected to the Internet and give the user the impression that he is connected to a network just like the WWW. Attempts by the user to access Web sites should resolve the legitimate WWW host address and path to a local host with a local IP address and a local, synchronized "shadow" copy of the true content, while attempts to access web content not shadowed on the stand-alone network may by default show a local Web-site content that assists the user in understanding shadowing. Synchronizing URLs and contents permits users to bookmark pages from a stand-alone site and use the bookmarks on the WWW later.

All this capability, preferably, is built into a single, local device that acts as AP, router, DNS and Web server without depending on a real-time connection to the Internet. Services available on the stand-alone network may include any or all services available on the Web, such as e-mail, file downloads, chat and so on, in addition to serving Web pages, although limited to the local network.

SUMMARY OF THE INVENTION

An aspect of the present invention is a method of providing a local web service shadowing a target host on the Internet with local host name address resolution and optionally with local address configuration of user hosts. The method optionally comprises the step of leasing an IP address or renewing a lease on an IP address in a communication link session with the user device in the ordinary fashion. This IP address may have been previously established in another connection session, or it may be leased at the time of connection for a specified duration. Alternatively, the IP address may be manually assigned and fixed for an indefinite duration. The method further comprises the step of resolving, when requested, host (domain) names locally in a stand-alone fashion without passing queries outside the stand-alone network to host addresses solely within the stand-alone network in accordance with rules designed to keep the network closed. The method further comprises the user device's accepting the hostname-address resolution provided by the stand-alone system, whether seemingly correct or actually correct, and then using the provided address to post its request for Web-site content. The method further comprises substantially delivering Web-site content, either as requested or as a substitute for what was requested or as an indication that the content is not available from the host at the address provided.

Another aspect of the present invention is a method of providing a wireless local web service with local host name address resolution and optionally with local address configuration of user hosts. The method comprises the step of connecting the user device through a wireless AP and optionally leasing an IP address or renewing a lease on an IP address in a communication link session with the user device in the ordinary fashion. This IP address may have been previously established in another connection session, or it may be leased at the time of connection for a specified duration.

Alternatively, the IP address may be manually assigned and fixed for an indefinite duration. The method further comprises the step of resolving, when requested, host (domain) names locally in a stand-alone fashion without passing queries outside the stand-alone network to host addresses solely within the stand-alone network in accordance with rules designed to keep the network closed. The method further comprises the user device's accepting the hostname-address resolution provided by the stand-alone system, whether seemingly correct or actually correct, and then using the provided address to post its request for Web-site content. The method further comprises substantially delivering Web-site content, either as requested or as a substitute for what was requested or as an indication that the content is not available from the host at the address provided.

Another aspect of the present invention is a local stand-alone web service system. The system comprises a router or a switch. The system further comprises a hostname-address resolution server. The system further comprises at least one web server. Preferably, all servers are contained within the appliance containing the router or switch or at least are co-located with it. In accordance with the invention a client request for Web content received through the router or switch is passed to a local server (host) on the stand-alone network. The hostname-address resolution server resolves all target host names to local addresses on the stand-alone network, no matter where they actually are located. Configuration of visiting hosts with local addresses may be offered as part of the router or switch functions.

Another aspect of the present invention is a local wireless web service system. The system comprises a wireless AP that optionally supports local address configuration of wireless hosts. The AP preferably integrates either an IP router or a switch. The system further comprises a hostname-address resolution server. The system further comprises at least one Web server. Preferably, all servers are contained within the appliance containing the wireless AP or at least are co-located with it. In accordance with the invention a client request for Web content received through the router or switch associated with the wireless AP is passed to a local server (host) on the stand-alone network.

The hostname-address resolution server preferably resolves all target host names to local addresses on the stand-alone network, no matter where they actually are located. Configuration of wireless hosts with local addresses may be offered as part of the wireless AP functions.

Alternately, rather than the target host's shadow (false) records' being maintained in the DNS, the router itself may contain records in its table for routing that direct the particular domain to an address on the local network instead of its true location on the Internet. While this can result in a similar effect to the DNS' having fake records, it has the disadvantage that the routing tables cannot be maintained automatically by updates such as RIP updates, and if multiple routers are installed on the local network, each of them must have manual updates applied for the target host's shadow location. Worse, the host itself needs to have the actual IP address of the target and the routing network must be organized to mirror the Internet including the sub-network of the target host domain.

While this invention is suitable for those situations where the operator and users of the private, stand-alone network desire to provide local, synchronized web content, a hybrid of such a network with the capability to interconnect as needed or desired with the World Wide Web would be a useful variation. Such a hybrid, combining the features of the described invention with the optional service that is protected from unauthorized use to link into the Internet would be of substantial utility. A controlled gateway to the Internet could be implemented as an optional, added component to the invention, similar to modern firewalls by permitting only certain hosts at particular addresses or certain users, having been pre-authorized, to penetrate the firewall. These and other variations will occur to one of ordinary skill in the art, and are not deemed to depart from the scope of the invention.

DETAILED DESCRIPTION OF THE DRAWINGS

Figure 1:
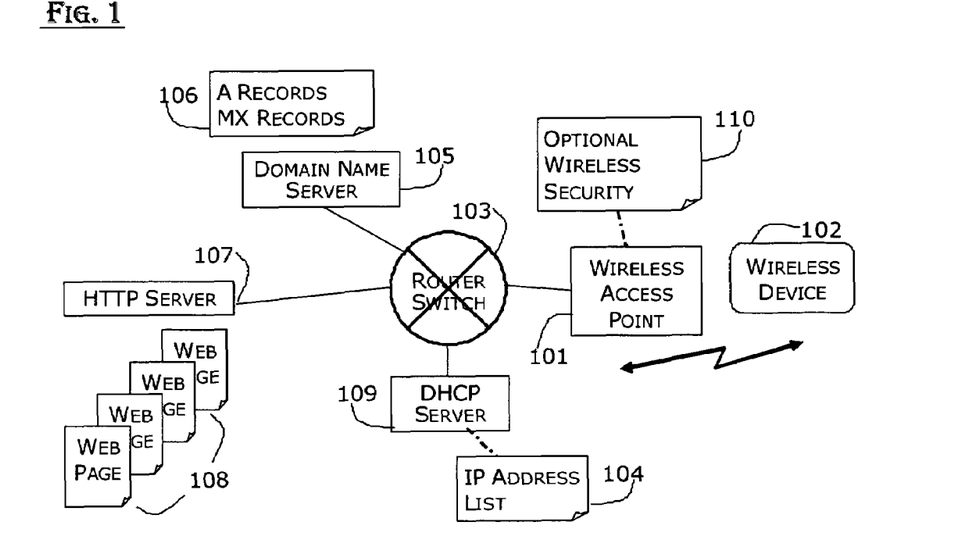
FIG. 1 is an electrical block diagram of a local wireless web service system in accordance with the present invention.

Referring to FIG. 1, an electrical block diagram of a local wireless web service system in accordance with the present invention comprises wireless access point 101 coupled wirelessly to one or more wireless devices 102 for users on which client software resides. The wireless access point 101 is coupled to a switch or router 103 to pass information to and from the various wireless devices 102 from and to various applications. The router or switch 103 preferably is integral to the wireless access point 101 and preferably an application running on the processing hardware within it. The switch or router 103 contains a list 104 of addresses and corresponding port locations through which various hosts are expected to be reached. As a switch the list 104 may contain media access control (MAC) addresses and corresponding physical or virtual ports on the switch 103, as is well-known for switches. As a router the list, 104 may contain Internet protocol (IP) addresses, corresponding physical or virtual ports on the router 103, along with designated gateway IP address, as is well-known for routers. Coupled to router or switch 103 is a domain name server (DNS) 105 for converting host names into IP addresses. Preferably the DNS 105 is integral to the wireless access point 101 and is another application running on the hardware constituting the router-switch 103 or wireless access point 101. The DNS 105 contains a list 106 of hostnames and corresponding IP addresses, at least one of which, in accordance with the invention falsely indicates a host on the local network. The router-switch 103 is coupled to a web server 107. Hosted on the web server 107 are various documents, web pages or other content 108, which are served up to client's requesting them. Preferably,the web server 107 and its contents 108 are integral to the wireless access point 101 and the server is an application running on the hardware and web content 108 is stored on the hardware constituting the wireless access point 101 or switch-router 103. Preferably a server 109 to assign IP addresses for wireless devices 102, such as dynamic host configuration protocol (DHCP) is an application integral to the wireless access point, which might also be used for other non-integral hosts. Optionally, an application 110 to provide security for the wireless link or possibly to provide security for elements not integral to the wire-less access point 101 by encrypting data and/or authenticating users and software. Optionally, an application 110 to provide security for the wireless link or possibly to provide security for elements not integral to the wireless access point 101 by encrypting data and/or authenticating users and software.

A wireless device 102 detects the availability of a network through the wireless access point 101. The wireless device 102 establishes a connection through the access point 101 being assigned an IP address and the given the IP address of local DNS 105 from DHCP server 109 and becoming a registered address on router list 104 by following methods well-known in the art. Once a connection is established the client wireless device 102 may make a request for web content 108 from a site that is shadowed on the local network. The request consists of first a DNS request from the client browser on the wireless device 102 for the IP address of a hostname for a website, which is passed, not to the Internet, but to DNS server 105. DNS server 105 examines the hostname to determine if the website is shadowed on the local network and returns the IP address of hypertext transfer protocol (HTTP) server 107 to the wireless device. The client browser on the wireless device 102 then sends the actual web content request ('get' or 'post') to the IP address previously indicated by the local DNS 105. "Getting" or "Posting" are by a client are similar in nature. A 'get' normally passes little information to the server, and a 'post' normally passes more than it receives back from the server.

The HTTP "web" server 107 receives the web content request including path and document name plus any additional information as is well-known in the art. The web server 107 is pre-programmed with a hierarchy of folders (directories) that would correspond to those on the actual website that the server is shadowing. The particular document specified by the client browser at the wireless device 102 may be stored within the apparent directory structure of files on web server 107. If the web page (document) is found by the web server 107 that corresponds to the request, the document is returned via router-switch 103 through the wireless access point 101 to the requesting browser on wireless device 102. At some point in time, preferably when the shadow website is created, at least one of the documents stored within the directory path is a synchronized copy of the actual corresponding document on the real website. Later the copy on the actual website might be changed and re-synchronization (copying the new document to the shadow website) would be necessary. Well-known in the art is that directory structures do not actually have to contain folders, but rather a pointer or alias to the directory location may replace a complex pathname. Documents might be requested that simply are not shadowed on the local website and HTTP servers commonly respond to such erroneous requests with a '404 Error,' indicating the path or document cannot be found. In practicing this invention it would be advisable to customize the error page retrieved to inform the user of the fact that not all documents may have been shadowed and that connecting to the website over the Internet may allow the user to retrieve it. Such an 'error' web page preferably comprises one of the web pages 108 on the server 107.

Other web content may be accessed in similar fashion to web pages thus providing other services such as chat on the local network or file downloads that mirror the true website. Even though all web content of the target host may not be mirrored on the local shadow host, compatibility with the methods is maintained.

Figure 2:
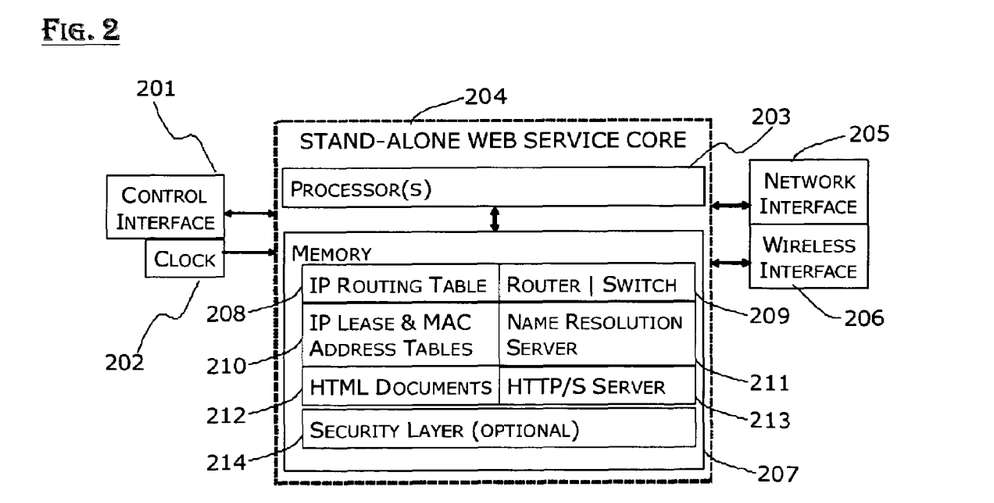
FIG. 2 is a functional electrical block diagram of a local web service system in accordance with the present invention.

Referring to FIG. 2, a functional electrical block diagram of a local web service system in accordance with the present invention, the core of the system 204 comprises a processor 203 like Intel 8051 with memory 207, the memory may consist of several types, such as read-only memory (ROM), flash or other reprogrammable memory, or volatile random-access memory (RAM). Preferably, the portion of memory for long-term unchanging items is ROM, the portion that seldom changes is reprogrammable memory, e.g. flash, and the part for often changed items is RAM. Programs and routines, like the servers 213, security 214, switches and routers 209, are not expected to change for long periods. Web documents 212, including shadowed ones, preferably are remembered despite loss of power to the appliance, represented in the figure. MAC tables 210, lease tables for IP addresses 210, routing tables 210, and the like may be volatile and re-buildable from normal discovery routines, but some items must be kept intact despite power loss, like security routines, parameters and credentials in 214, in particular MAC and IP addresses whose nature, location or characteristics cannot be discovered readily or assuredly, and target host names to be shadowed in name resolution server 211.

A control interface 201 is coupled to the core 204 to provide a local mechanism for managing the system. A clock 202 is coupled to the core 204 to provide timing pulses to run and synchronize the system. A network interface 205 and a wireless interface 206 are coupled to the core 204 and in turn are coupled to external networks, including any outboard hosts. A network interface 205 is preferably Ethernet compatible, having at least one IP address assignable, but may be serial or include a serial port for connection to a wide area network. A wireless interface 206 is preferably 802.11g or compliant to a similar wireless standard. At least one interface 205 or 206 is required, but a plurality of interfaces is within the scope of the invention. A control interface 201 may alternately be replaced by control via network interface 205 or 206. Recognizing the potential risk of control via the network, security for such alternate control is highly recommended.

Preferably, web content, e.g. HTML documents, 212 are up-loadable to the memory 207 by simple means. Use of the wireless interface 206 in a secure mode is extremely useful some applications where physical access to a plug-in control interface 201 is restricted. The control interface 201 may alternately be implemented as a medium not requiring physical plug-in, such as infra-red. Despite other media possibilities, the physical locations of appliances in accordance with the invention are expected to be mounted in places inconvenient for quick physical access so as to protect the device from theft and tampering.

Figure 3:
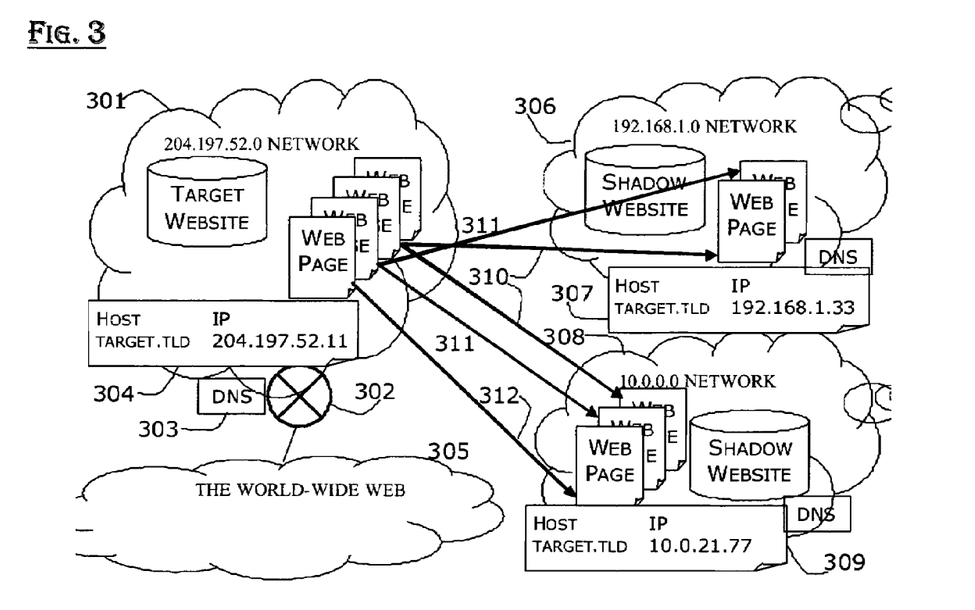
FIG. 3 is a data relation diagram of exemplary synchronized local websites in accordance with the present invention.

Referring to FIG. 3, a data relation diagram of an exemplary synchronized local website in accordance with the present invention, network 301 with network addresses including 204.197.52.0 and 204.197.52.11 are coupled to the Internet 305 via router 302. On network 301 is the target website host at address 204.197.52.11 as shown in the DNS record 304 on a DNS host 303 coupled to router 302. A stand-alone network 306 that includes network addresses 192.168.1.0 and 192.168.1.33 has two pages 310 and 311 from the target website copied at some point in time onto the shadow website server. Periodically, the copies are preferably updated to reflect changes at the true host. A DNS record 307 falsely indicates that the target website that is shadowed on network 306 is hosted at 192.168.1.33.

Another stand-alone network 308 that includes addresses 10.0.0.0 and 10.0.21.77 has three pages 310, 311, and 312 copied from the target website copied onto the shadow website server. A DNS record 309 falsely indicates that the target website that is shadowed on network 308 is hosted at 10.0.21.77. A large private network may be inferred from usage of the 10.0.0.0 address space. The shadow website server may be separated from the core described elsewhere herein and not made an integral part of an appliance, coupled to the core using TCP/IP as is well know in the art. The segment containing the shadow server and the client access can be segmented from the remainder of the network by a firewall or similar secure method to isolate client access from the remainder of the network, which may contain proprietary information. Management of the shadow server and its contents from elsewhere on the remainder the network is possible and may be desirable. The remainder of the network may actually have access to the Internet but the DNS on the isolated shadow segment will direct requests for target content to the shadow, not over the Internet. Outboard hosts may be present.

Preferably, exemplary networks 306 and 308 have wireless access into them, although conceptually this is unnecessary so long as in accordance with the invention a name resolution service points to a local host with synchronized web content of a target website, rather than to the actual location of the target. Wireless access using IEEE 802.11 is preferred because of its widespread adoption and currency but any temporary access method is suited to the invention as well.

It is not necessary that all web content from the target be copied to the shadow server or servers. Copying can be effected by temporary wired or wireless connection between the target and the shadow networks. The memory from the shadow server can also be of the removable type, such as a compact flash card, and loaded with the web content from the target website and then plugged into the server at the shadow site. If the target website content changes, the shadow sites may need to be re-synchronized. Compact flash cards or other encapsulated memory devices are fairly simple to program and easy to plug into and out of a device, making them a preferred method to hold the copied web content, but wireless transfers are also convenient from a wireless PDA.

Figure 4:
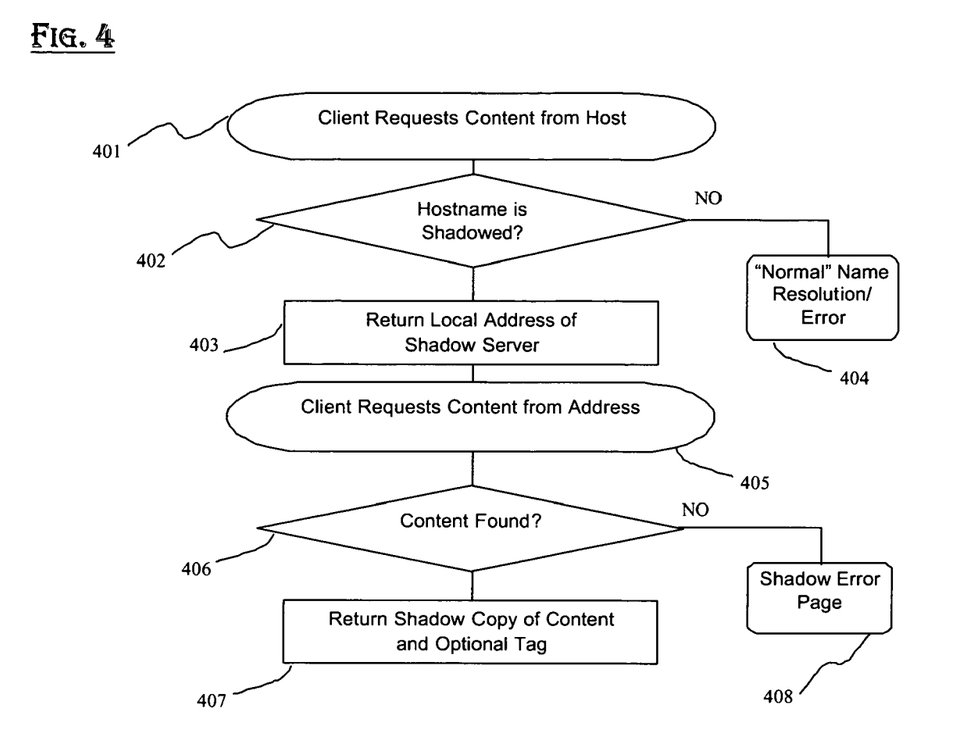
FIG. 4 is a system flow chart in accordance with the present invention.

Referring to FIG. 4, a system flow chart in accordance with the present invention, when a client, such as a wirelessly connected user or a user at a wired host, makes a request 401 for some content over the world-wide web, the process begins. First, the hostname is passed in a DNS resolution request and is examined in step 402 to determine if the host is shadowed on the local service. The list of shadowed hosts is specially provisioned into long term memory along with its true IP address. If the host is not shadowed and not an existing host on the network, normal name resolution error processing occurs in step 404. In step 404 the name requested may be a normal host on the network instead of a shadowed host. Because the appliance is expected to operate without up-to-date information about hosts on the Internet, it would be more proper to return a customized error page to the user, indicating that because no connection to the Internet is available, the host may or may not actually be reachable when the user connects to the WWW.

Hostnames that are shadowed will return at least one IP address on the local network in step 403, preferably the web content being served from the memory of the appliance. The client then uses the local address to request the said web content in step 405 via the HTTP server. Notably, if the IP address points to a process within the appliance, then the entire TCP/IP protocol stack need not be traversed to retrieve the web content. An interprocess communication 'daemon' can be used to send the request directly from the receiving application to the serving application.

In step 406 the HTTP or HTTPS server attempts to access the requested content using the shadowed path and filename. If the content cannot be found because either the path is invalid or not mirrored, or the file is not shadowed, then an error is return in step 408. Because not all content on the shadowed host need be duplicated on the local server, this error page preferably indicates to the user that the content may be accessible when connected to the actual website and not the shadow.

Finally, if the content is found, it is sent in response to the client request. Optionally, other information may be returned to the client, such as "cookies" for state tracking across the shadowed and the actual website. A cookie is a separate file associated with a host that should be returned by a client when accessing the site. A cookie file allows passing of information from server to client and back to server, such as session, user identification and the like, and preferably can contain identification of the shadow website in the event that more than one shadow is created. A cookie can also be used to identify shadow access errors that result from requested content inaccessible from the shadow site. Other forms of parameter passing are possible under HTTP, but cookies provide a more controllable means of storing the information on the client machine.

Figure 5:
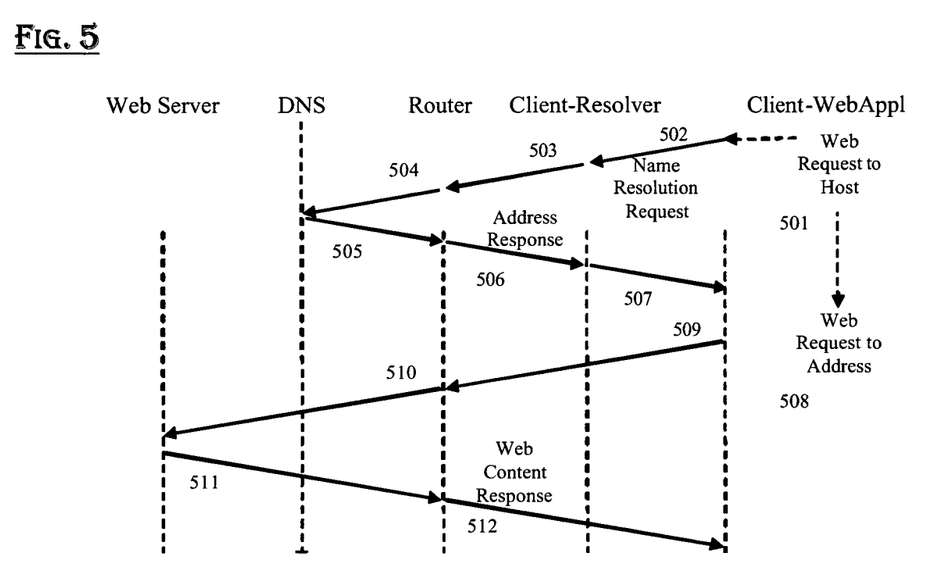
FIG. 5 is a drawing typifying a sequence of application requests and responses in accordance with the present invention.

Referring to FIG. 5, a sequence diagram typifying application requests and responses in accordance with the present invention, a client web application, such as a web browser, in step 501 invokes a request for a filename on a path at a host. The web browser suspends the invocation until the location of the host can be determined in step 508. A hostname resolution process submits the name to a local cache on the machine in step 502 and if a currently valid IP address is cached, found address is returned to the suspended web request for transmission to that address. If no cached address is available, in step 503 and 504 the resolution process extends into the network to the identified domain name (DNS) server, normally provisioned at the time a dynamic host control protocol (DHCP) IP address is assigned to the client machine. The DNS responds in step 505 and 506 either with an address on the local network if the website is shadowed, or with an error if the website is not shadowed and the host does not exist on the network. The resolver on the client in step 507 caches the response and passes it back to the original invoking process, where in step 508 the host is converted to an address.

The resolved hostname is replaced by the network address to pass the web content request in step 509 and 510 to the indicated web server. The listener at the web server responds to the request in step 511 with the web content and passes it back to the client in step 512.

Alternately, the name resolution could be accomplished by WINS or other similar name mapping system and still not depart from the spirit of this disclosure. Additionally, the address returned need not be an IP address but any suitable routed protocol, such as IPX or even a switching or MAC address such as Ethernet, and yet be envisioned in the scope of this invention. The server that shadows another server located elsewhere on another network need not operate on HTTP or HTTPS over TCP although the generality offered by these makes them preferable to UDP and other transport protocols and other application or transfer protocols. Such alternate approaches do not depart from the scope of this disclosed invention.

These and other variations will occur to one of ordinary skill in the art, and are not deemed to depart from the scope of the claimed invention.

Thus, it should be clear from the preceding disclosure that the present invention provides a method and apparatus for providing a stand-alone wireless web service, not connected to the Internet Advantageously, the method and apparatus remain fully compatible with WWW methods, even when not connected to the Internet and give the user the impression that he is connected to a network just like the WWW. Attempts to access contents of a website shadowed on the local return synchronized shadow copies of the content on the true website. Attempts to access contents of websites not shadowed within the appliance or on the local network can return a default website content to assist the user in understanding shadowing of the true website. Bookmarks and cookies remain compatible from the local network to the true website. Other services that may be offered from the true website or the local network can still be offered but will be restricted to the scope of the local network, including file downloads, chat and e-mail.

Many modifications and variations of the present invention are possible in light of the above teachings. Thus, it is to be understood that, within the scope of the appended claims, the invention can be practiced other than as described herein above.

What is claimed is:

1. A method in a wireless system for providing synchronized local web service, the method comprising the steps of:

requesting by a wireless client through a wireless access point coupled to a switch or router for an address of a host;

responding by an address-resolution service to the address request with an address on a local network, instead of the true address of the host;

posting by a client through a wireless access point to the address in the response a request for content or for service hosted on the true host; and replying by a host as if it were tire true host but at a local address to the client in response to the content- or service-request with at least one copy of the content or service on the true host located on another network, said copy being synchronized at some point in time with content at said true host.

2. A method in wired system for providing synchronized local web service, the method comprising the steps of:

requesting by a client through a switch or router for an address of a host;

responding by an address-resolution service to the address request with an address on a local network, instead of the true address of the host;

posting by a client through a switch or router to the address in the response a request for content or for service hosted on the true host; and replying by a host as if it were the true host but at a local address to the client in response to the content- or service-request with at least one copy of the content or service on the true host located on another network, said copy being synchronized at some point in time with content at said true host.

3. A wireless local web service system comprising:

a wireless access point means coupled to a switching or routing means of a communication network to provide wireless hosts network access;

a switching or routing means coupled to a server, a host, or another switch or router to determine an appropriate port of the switch or router to forward messages received at an address on a port by referring to a table of host names, network addresses and ports, and switching or forwarding said messages accordingly to their destinations;

an address resolution means coupled to a switch or router of said network, for accepting and responding to requests to resolve a host name into a network address and/or port wherein at least one host name that is actually located on another network, such as on the Internet, is falsely listed at an address on the local network; and a server coupled to a switch or router of said network, for accepting requests at the at least one falsely resolved address and for responding to said requests for content or service, containing copies of at least some content or service available at the host truly located on another network, said copies being synchronized at some point in time with content at said true host.

4. A local web service system comprising:

a switching or routing means coupled to a server, a host, or another switch or router to determine an appropriate port of the switch or router to forward messages received at an address on a port by referring to a table of host names, network addresses and ports, and switching or forwarding said messages accordingly to their destinations;

an address resolution means coupled to a switch or router of said network, for accepting and responding to requests to resolve a host name into a network address and/or port wherein at least one host name that is actually located on another network, such as on the Internet, is falsely listed at an address on the local network; and a server coupled to a switch or router of said network, for accepting requests at the at least one falsely resolved address and for responding to said requests for content or service, containing copies of at least some content or service available at the host truly located on another network, said copies being synchronized at some point in time with content at said true host.

5. The method in claim 1, wherein the address-resolution service is a DNS server.

6. The method in claim 1, wherein the address-resolution service is a WINS server.

7. The method in claim 1, wherein the posting is a HTTP Get.

8. The method in claim 1, wherein the posting is a HTTP Post.

9. The method in claim 1, wherein the reply is a HTML document.

10. The method in claim 2, wherein the address-resolution service is a DNS server.

11. The method in claim 2, wherein the address-resolution service is a WINS server.

12. The method in claim 2, wherein the posting is a HTTP Get.

13. The method in claim 2, wherein the posting is a HTTP Post.

14. The method in claim 2, wherein the reply is a HTML document.

15. The system in claim 3, wherein the wireless access point, the switching and/or routing means, and at least either the address resolution means or the server are all integral to a single appliance.

16. The system in claim 4, wherein the switching and/or routing means, and at least either the address resolution means or the server are all integral to a single appliance.

17. The method in claim 1, wherein the responding step gives the true address of the host, and the posting step is modified so that the switch or router directs traffic not to a path between the true host at the true address and said client, but between a shadow host on the local network appearing as if it were at the true address and said client, and the replying step is modified so that the switch or router directs traffic not to a path between the true host at the true address and said client, but between a shadow host on the local network appearing as if it were at the true address and said client.

18. The method in claim 2, wherein the responding step gives the true address of the host, and the posting step is modified so that the switch or router directs traffic not to a path between the true host at the true address and said client, but between a shadow host on the local network appearing as if it were at the true address and said client, and the replying step is modified so that the switch or router directs traffic not to a path between the true host at the true address and said client, but between a shadow host on the local network appearing as if it were at, the true address and said client.

\* \* \* \* \*